(12) United States Patent
Balin et al.

(10) Patent No.: US 7,664,795 B2
(45) Date of Patent: Feb. 16, 2010

(54) APPARATUS AND METHOD FOR DATABASE MIGRATION

(75) Inventors: Dmitry Balin, San Jose, CA (US); Igor Bekelman, Foster City, CA (US); Irena Balin, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 156 days.

(21) Appl. No.: 10/952,278

(22) Filed: Sep. 27, 2004

(65) Prior Publication Data

US 2005/0149537 A1    Jul. 7, 2005

Related U.S. Application Data

(60) Provisional application No. 60/506,810, filed on Sep. 26, 2003.

(51) Int. Cl.
*G06F 17/30* (2006.01)
(52) U.S. Cl. .................. 707/204; 707/201; 707/205; 707/100; 707/4; 707/10; 717/177; 717/115; 717/172; 709/220; 709/223
(58) Field of Classification Search .............. 707/3, 707/102, 103 R, 204, 201, 205, 100, 4, 10; 717/177, 115, 172; 709/220, 223
See application file for complete search history.

(56) References Cited

U.S. PATENT DOCUMENTS

| | | | | |
|---|---|---|---|---|
| 5,642,505 A | * | 6/1997 | Fushimi | 707/204 |
| 5,987,452 A | * | 11/1999 | Kung | 707/4 |
| 6,003,026 A | * | 12/1999 | Bonzi | 707/4 |
| 6,212,513 B1 | * | 4/2001 | Shiratori et al. | 707/2 |
| 6,442,541 B1 | * | 8/2002 | Clark et al. | 707/3 |
| 6,915,287 B1 | * | 7/2005 | Felsted et al. | 707/1 |
| 6,996,589 B1 | * | 2/2006 | Jayaram et al. | 707/204 |
| 7,107,589 B1 | * | 9/2006 | Tal et al. | 717/177 |
| 2002/0091702 A1 | * | 7/2002 | Mullins | 707/100 |
| 2003/0028555 A1 | * | 2/2003 | Young et al. | 707/204 |
| 2004/0249792 A1 | * | 12/2004 | Halim | 707/3 |
| 2004/0254948 A1 | * | 12/2004 | Yao | 707/101 |
| 2005/0071359 A1 | * | 3/2005 | Elandassery et al. | 707/102 |

* cited by examiner

*Primary Examiner*—Khanh B Pham
*Assistant Examiner*—Syling Yen

(57) ABSTRACT

Systems and methods consistent with concepts of the present embodiment of the inventive concept provide mechanisms for database migration from one database (source database platform) platform to another (target database platform). The target and source databases can be any relational databases including, without limitation, Oracle, SQL Server (Microsoft), DB2 UDB (IBM), Sybase, MySQL, PostgreSQL, and the like. The inventive methodology will work well for migration of any relational database that implements SQL language from one platform to another. A feature of the invention is the provision of a virtual engine enabling the running of an original application on a migrated database.

15 Claims, 19 Drawing Sheets

Oracle:                                    Microsoft SQL Server:

| | | |
|---|---|---|
| UPDATE T_ITEM<br>　　SET APPROVAL_FLAG = 1<br>WHERE (ITEM_ID = ItemID ) | Statement<br>#1 | UPDATE T_ITEM<br>　　SET APPROVAL_FLAG = 1<br>WHERE (ITEM_ID = @ItemID) |
| SELECT APPROVAL_FLAG INTO<br>current_status FROM<br>T_ATTRIBUTE<br>WHERE ATTRIBUTE_ID = AttributeID; | Statement<br>#2 | SELECT @current_status =<br>APPROVAL_FLAG<br>　　FROM T_ATTRIBUTE<br>　　　　WHERE (ATTRIBUTE_ID =<br>@AttributeID) |
| SP_CRE_ITC_ATTRIBUTE<br>　　(ItemTypeClassID, AttributeID,<br>NewID ) ; | Statement<br>#3 | EXEC SP_CRE_ITC_ATTRIBUTE<br>　　@ItemTypeClassID, @AttributeID,<br>@NewID |
| RAISE_APPLICATION_ERROR<br>　　( -20102, NULL ); | Statement<br>#4 | RAISERROR (50002, 16, 1) |
| SELECT IT.ITEM_TYPE_ID, I.ITEM_ID,<br>ITDOM.ITEM_TYPE_DOMAIN_ID,<br>ITD.ITEM_TYPE_DESCRIPTOR_ID<br>　　FROM ITEM_OWNER.T_ITEM_TYPE<br>IT, ITEM_OWNER.T_ITEM I,<br>ITEM_OWNER.T_ITEM_TYPE_DOMAIN<br>ITDOM,<br>ITEM_OWNER.T_ITEM_TYPE_DESCRIP<br>TOR ITD<br>　　WHERE IT.item_type_id =<br>I.item_type_id**(+)** AND IT.item_type_id =<br>ITDOM.item_type_id**(+)** AND<br>IT.item_type_id = ITD.item_type_id**(+)** | Statement<br>#5 | SELECT IT.ITEM_TYPE_ID, I.ITEM_ID,<br>ITDOM.ITEM_TYPE_DOMAIN_ID,<br>ITD.ITEM_TYPE_DESCRIPTOR_ID<br>　　FROM ITEM_OWNER.T_ITEM_TYPE IT,<br>ITEM_OWNER.T_ITEM I,<br>ITEM_OWNER.T_ITEM_TYPE_DOMAIN<br>ITDOM,<br>ITEM_OWNER.T_ITEM_TYPE_DESCRIPT<br>OR ITD<br>　　WHERE ((IT.item_type_id **\*=**<br>I.item_type_id) AND ((IT.item_type_id **\*=<br>ITDOM.item_type_id) AND (IT.item_type_id<br>\*=** ITD.item_type_id))) |

FIG. 1

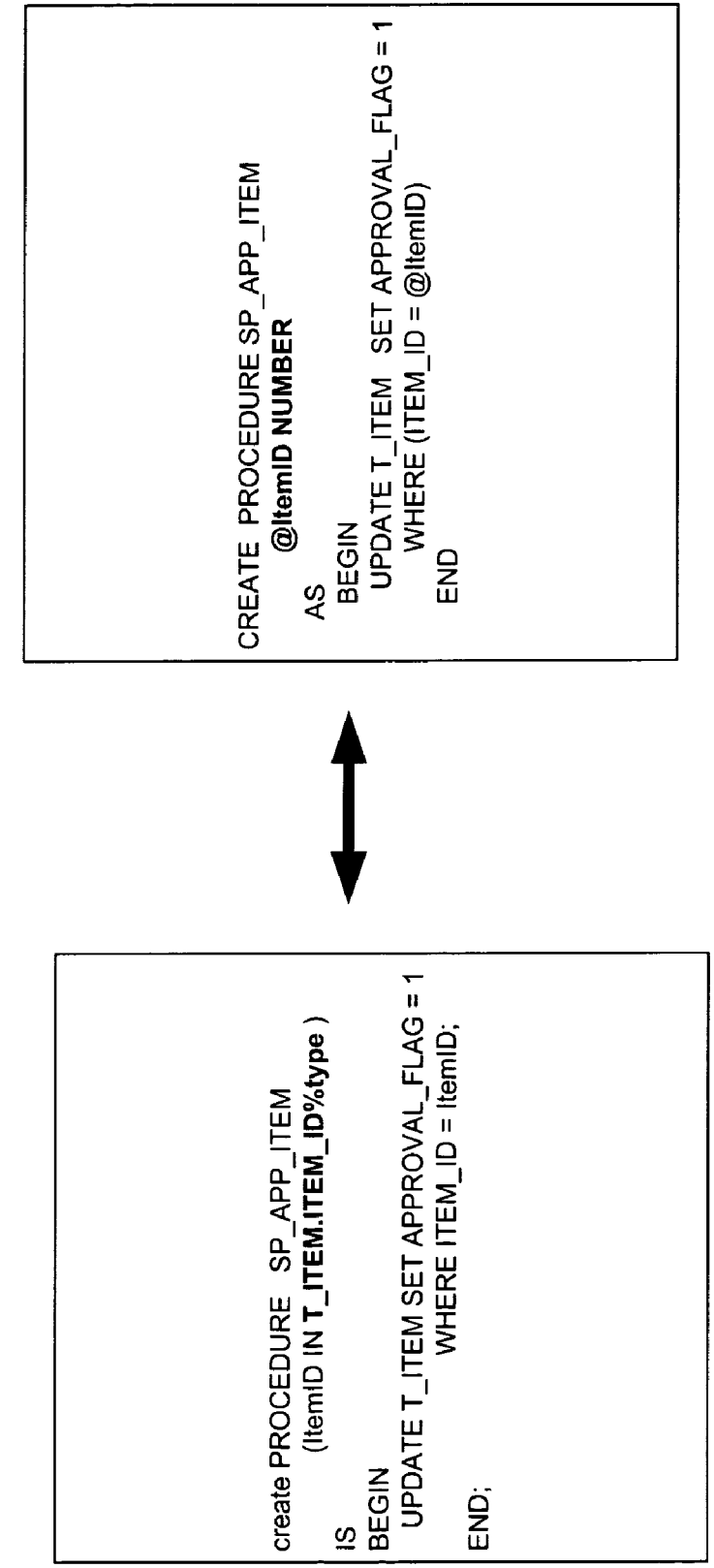

FIG. 5B

```
CREATE PROCEDURE SP_NEW_ATTRIBUTE
                @AttributeCode VARCHAR2,
                @AttributeName
VARCHAR2,
                @AttributeTypeCode VARCHAR2,
                @NewID NUMBER OUTPUT
AS
DECLARE
    @temp_attribute_type_id NUMBER
BEGIN
    EXEC SP_LOO_ATTRIBUTE_TYPE
                @AttributeTypeCode,
                @temp_attribute_type_id
    EXEC SP_CRE_ATTRIBUTE
                @AttributeCode,
                @AttributeName,
                @temp_attribute_type_id,
                @NewID
END
```

```
CREATE OR REPLACE PROCEDURE SP_NEW_ATTRIBUTE (
    AttributeCode T_ATTRIBUTE.ATTRIBUTE_CODE%TYPE,
    AttributeName T_ATTRIBUTE.ATTRIBUTE_NAME%TYPE,
    AttributeTypeCode
        T_ATTRIBUTE_TYPE.ATTRIBUTE_TYPE_CODE%TYPE,
    NewID T_ATTRIBUTE.ATTRIBUTE_ID%TYPE OUT)
AS
DECLARE
    temp_attribute_type_id
        T_ATTRIBUTE_TYPE.ATTRIBUTE_TYPE_ID%TYPE;
BEGIN
    SP_LOO_ATTRIBUTE_TYPE ( AttributeTypeCode,
                temp_attribute_type_id ) ;
    SP_CRE_ATTRIBUTE ( AttributeCode, AttributeName,
                temp_attribute_type_id, NewID ) ;
END;
```

*Oracle:*

Oracle database implements the *sequence* object that serves as a counter. The object implements the methods that help to work with the counter. For example:

*SQL Server:*

Microsoft SQL Server doesn't provide sequence object functionality as a database object. That is why the database conversion from Oracle to SQL Server should provide the substitute for sequence functionality.

A possible solution will implement a global table SequenceEmulator. Each row of the table emulates the behavior of appropriate sequence object.

SequenceEmulatorTable

| Seq_name | Increment_by | Min_value | Max_value | CurVal |
|---|---|---|---|---|
| seqObj | 1 | 0 | 9999 | |

Microsoft T-SQL doesn't provide the same
functionality as Oracle in terms of variable
declaration scopes. Therefore, during conversion
the variable that is re-defined again in original code
needs to be renamed. Also, all calls to this variable
should change its name appropriately. For example,

```
CREATE
    PROCEDURE test1
    AS
        DECLARE
            @i varchar (255 )
        BEGIN
            SET @i = 'abc'
            BEGIN
                DECLARE
                    @j numeric
                BEGIN
                    SET @j = 25
                END
            END
        END
```

Oracle PL/SQL allows the same variable
name to be re-declared in different blocks.
This provides a separate visibility scope for
the same variable name. For example,
variable "i" is declared twice in separated
blocks.

```
CREATE OR REPLACE
    PROCEDURE test1
    AS
        i varchar2 ( 255 ) ;
    BEGIN
        i := 'abc';
        BEGIN
            DECLARE
                i number;
            BEGIN
                i := 25;
            END;
        END;
    END;
```

Oracle:

```
select SYSDATE, NVL(1, 1), concat('2-', '-3'),
        substr('1234567890', 3, 3), mod(32, 5)
from dual;

select add_months(SYSDATE, 2),
    months_between(add_months(SYSDATE, -5),
        SYSDATE) from dual;

select to_char('kjbsdlkhbfs'), to_date('01 sep 2000'),
        to_number('1234') from dual;

select extract(year from SYSDATE),
    extract(month from SYSDATE),
    extract(day from date '1998-03-07'),
    extract(hour from date '1998-03-07'),
    extract(minute from date '1998-03-07'),
    extract(second from date '1998-03-07')
        from dual;

SELECT DECODE (123,
    1, 'Southlake',
    2, 'San Francisco',
    3, 'New Jersey',
    4, 'Seattle', 'Non-domestic')
quantity_on_hand FROM dual;
```

SQL Server:

```
SELECT getdate(), isnull ( 1, 1 ), ( '2-' + '-3'),
        substring ( '1234567890', 3, 3 ),
(32 % 5)

SELECT DATEADD ( MONTH, 2, getdate() ),
        DATEDIFF ( MONTH, getdate(),
        DATEADD ( MONTH, -5, getdate() ) )

SELECT CAST( 'kjbsdlkhbfs' AS CHAR),
        CAST( '01 sep 2000' AS DATETIME),
        CAST( '1234' AS NUMERIC)

SELECT DATEPART ( YEAR, getdate() ),
        DATEPART ( MONTH, getdate() ),
        DATEPART ( DAY, '1998-03-07'),
        DATEPART ( HOUR, '1998-
        03-07' ),         DATEPART (
MINUTE, '1998-03-07' ),
        DATEPART ( SECOND, '1998-03-07' )

SELECT CASE 123 WHEN 1 THEN 'Southlake'
        WHEN 2 THEN 'San Francisco'
        WHEN 3 THEN 'New Jersey'
        WHEN 4 THEN 'Seattle'
        ELSE 'Non-domestic' END
            QUANTITY_ON_HAND
```

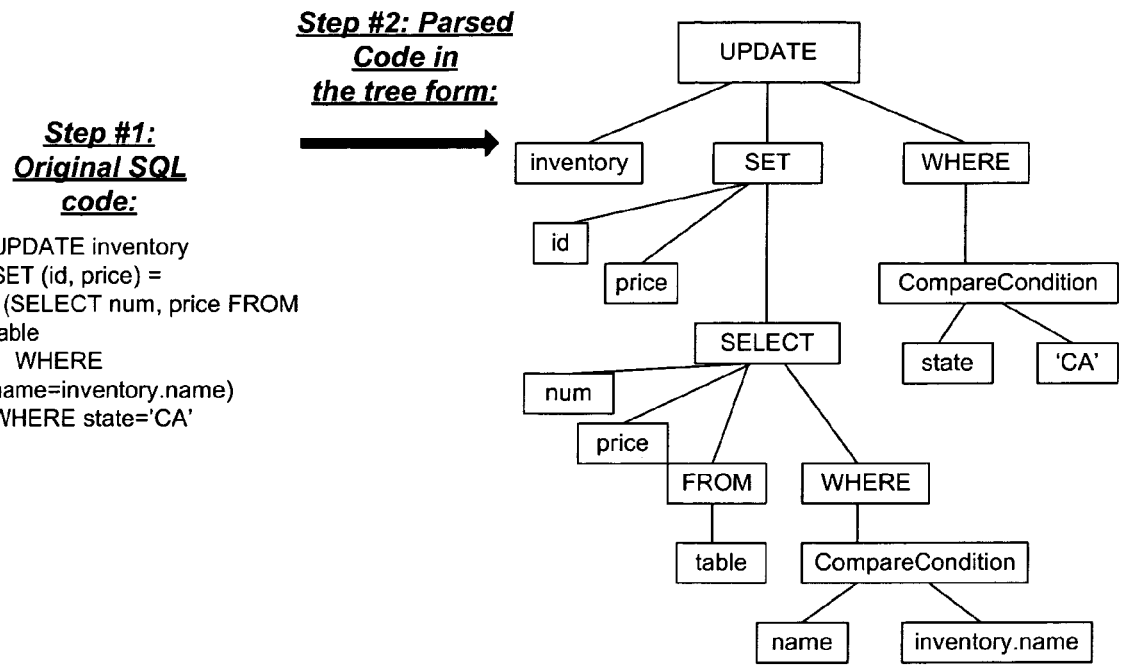
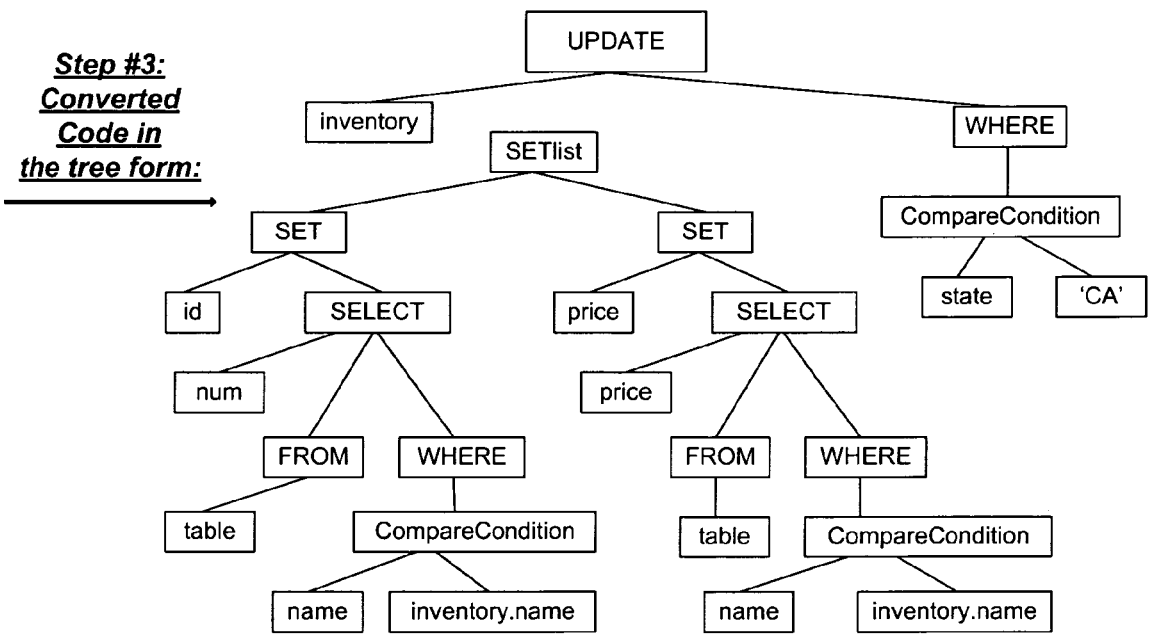
FIG. 11

SQL Conversion Cache

Original SQL statement coming from application developed for Oracle:

Converted SQL statement that works with Microsoft SQL Server:

Lookup KEY: → Association:

| Lookup KEY |
|---|
| UPDATE T_ITEM<br>SET APPROVAL_FLAG = 1<br>WHERE (ITEM_ID = ItemID ) |
| SELECT APPROVAL_FLAG INTO<br>current_status FROM T_ATTRIBUTE<br>WHERE ATTRIBUTE_ID = AttributeID; |
| SP_CRE_ITC_ATTRIBUTE<br>(ItemTypeClassID, AttributeID, NewID ); |
| RAISE_APPLICATION_ERROR<br>( -20102, NULL ); |
| SELECT IT.ITEM_TYPE_ID, I.ITEM_ID,<br>ITDOM.ITEM_TYPE_DOMAIN_ID,<br>ITD.ITEM_TYPE_DESCRIPTOR_ID<br>FROM ITEM_OWNER.T_ITEM_TYPE IT,<br>ITEM_OWNER.T_ITEM I,<br>ITEM_OWNER.T_ITEM_TYPE_DOMAIN ITDOM,<br>ITEM_OWNER.T_ITEM_TYPE_DESCRIPTOR ITD<br>WHERE IT.item_type_id = I.item_type_id(+) AND<br>IT.item_type_id = ITDOM.item_type_id(+) AND<br>IT.item_type_id = ITD.item_type_id(+) |

FIG. 14

APPARATUS AND METHOD FOR DATABASE MIGRATION

1. RELATED APPLICATIONS

This application claims priority from, and is a Continuation of, U.S. Provisional Application Ser. No. 60/506,810, filed Sep. 26, 2003.

2. FIELD OF THE INVENTION

The present invention relates generally to migrating a database, and more particularly, to migrating a database code between a source server and a target server, while the source and destination database may be of different platforms or provided by different vendors.

3. DESCRIPTION OF THE RELATED ART

Software applications using databases usually contain client SQL code (that runs in the application process space), stored procedures (that run inside the database) and the data stored in the database. The database itself may also contain the schema, which describes the tables' structure, keys and relationships.

The typical software application that works with the database has client/server or multi-tier architecture. SQL code can appear in the client, interleaved with the application code written in Java, C/C++, C# etc. Stored procedures (functions loaded into the database and running in its process space) are all written in SQL. The scripts that create the database (the schema and the code) are written in SQL as well.

There are multiple products on the market delivering different flavors and technologies in schema and data migration. However, the SQL code conversion from one dialect to another is a major challenge. Today, most of the migrations are executed manually which leads to multiple human errors, longer time and higher costs. Recently, IBM introduced a product that helps to automate conversion of SQL code from other platforms to IBM's DB2 UDB. However, the IBM product cannot be used for migration between other vendors' platforms. Also, Oracle introduced their Migration Workbench that helps to automate the conversion of SQL from other platforms to PL/SQL (Oracle SQL dialect). Again, this product cannot be used for migrating between other platforms. For example, currently there is no solution to migrate to SQL Server and Sybase platforms. The solution for a back-and-forth migration from one platform to another is also lacking.

This is a very challenging problem for businesses that want to run their products on multiple database platforms. Today, it is also nearly impossible to migrate the application with embedded SQL code without manually rewriting the application. Consequently, when performing database migration, one must also rewrite the application. Conversely, an application vendor must write several versions of the application to enable running on different platforms.

Migrating the database from one vendor platform to another is useful for a number of reasons. Here is a list of such real life examples:

Database consolidation—the IT department of the enterprise is using multiple database vendors, while each vendor's product has a similar feature set. The management wants to streamline the process and migrate to the platform of choice.

Company merge or acquisition—company X acquires/merges with company Y, which is running on the different database platform. The IT systems of both corporations have to merge and to migrate their products to one database platform.

Cost cutting—the company wants to migrate to a cheaper database platform to save the licensing costs.

Data growth—the company grows which leads to increased volumes of data and load on the database. There is a need to migrate to a more sophisticated database platform.

A software company needs to expand its customer base by supporting multiple database platforms instead of one for which it was developed.

The following is provided to assist the reader in understanding the problems associated with database migration. The language used for interfacing with relational databases is SQL. Each database platform implements its own flavor of SQL, although all these dialects stem from the early standard ANSI SQL-92. FIG. 1 illustrates the examples of SQL divergence between the dialects. FIG. 1 demonstrates the examples taken from Oracle PL/SQL and Microsoft SQL Server T-SQL language. Similar kind of differences can be found between DB2, Sybase, MySQL and PostgreSQL dialects.

To make the diagram more readable, appropriate syntax differences are in bold. Statement #1 demonstrates the syntax difference for local variables. Statement #2 demonstrates the syntax difference of SELECT statement. Statement #3 demonstrates the syntax difference using the local variables and calling the procedure for execution. Statement #4 demonstrates the semantic differences. In this case, Oracle and SQL Server use different functions with different parameter number to implement the same functionality. Statement #5 demonstrates the differences in handling the outer join feature of SQL. The conversion of this SQL code from one dialect to another, together with the schema migration imposes a substantial challenge to a database migration process.

4. SUMMARY

Systems and methods consistent with concepts of the present embodiment of the inventive concept provide mechanisms for database migration from one database (source database platform) to another (target database platform). The target and source databases can be any relational databases including, without limitation, Oracle, SQL Server (Microsoft), DB2 UDB (IBM), Sybase, MySQL, PostgreSQL, and the like. The inventive methodology will work well for migration of any relational database that implements SQL language from one platform to another.

According to an aspect of the invention, source database at platform A is converted into a target database at platform B, which performs the same functionality as the source database at platform A. The conversion process comprises the steps detailed as follows. The first step is source meta-database creation and loading to the memory. This meta-database is presented in the form of a tree and represents the essence of the data model. The next step is conversion of the schema by migrating the source database objects into the destination ones. During this conversion the objects like tables, columns, indexes, sequences etc. can change their parameters because of the inconsistency in the data types in source and destination databases. This follows by extracting the SQL code of the stored procedures and then parsing of the SQL code and presenting it in the internal tree structure. Declaration point references are setup for local identifiers. This follows by conversion of the parsed tree into the destination platform tree. The tree is transformed appropriately to express the actual SQL code conversion. Then a "pretty printer" components prints the converted code with the proper tabulation, emphasizing correct language components. The converted schema tree then produces the script. This script is loaded to create the target database objects. Finally, the converted SQL stored procedures are loaded into previously converted target database.

Another aspect of the invention is the provision of a virtual engine enabling the running of an original application on a migrated data. This particular feature of the inventive concept demonstrates how to run a client application that was designed for a database platform A to run against a database platform B without rewriting the application code. Using this embodiment of the inventive method introduces an additional innovation that enables run time switching of the application from platform A to B without any code change in application software.

According to yet another aspect of the invention, a system including an application converter is provided. The system receives as input an application which is capable of working only with a database at Platform A (uses SQL dialect A in the client code). A database is provided at Platform B, which performs the same functionality as the source database at Platform A. This state may be achieved after completion of conversion of the database schema and stored procedures to convert database from Platform A to Platform B. The system then provides an application which runs against database on Platform B and performs the same functionality as with the Platform A. Notably, the application code is not changed—only the database driver is replaced.

In a related aspect of the invention, a database driver used by the application is identified and replaced with an SQL Converter Wrapper. The application is run against the target database through all major use case scenarios in order to populate the cache. This kind of a "dry run" can be done during the final testing and doesn't introduce additional overhead to the application performance after deployment.

Another feature of this invention is database virtualization technology that builds upon database migration technology. Database virtualization is a software middleware, which allows client application developed for one database vendor to run on another database vendor system. All discrepancies that stem from database vendors systems are handled by the middleware so that the client software doesn't need to change in any way. This is a unique approach, which differs a lot from existing technologies in this field.

Additional application of the inventive concept allows the database developer to write code for database platform A and automatically convert it to the database B, C and D. This process shortens time to market for many software products.

5. BRIEF DESCRIPTION OF THE DRAWINGS

FIG. 1 illustrates examples of SQL divergence between the dialects.

FIG. 5 depicts an example of identifying structures that require type information for correct conversion.

FIGS. 6a and 6b depict an example of bridging over non-existing structures by emulating them in the target SQL dialect.

FIG. 7 depicts an example of handling transition between different language scopes.

FIG. 8 depicts an example of system function migration, in this case from Platform X being Oracle to Platform Y being SQL Server.

FIG. 11 depicts an example of SQL code parsing, tree presentation, the tree transformation and target SQL code generation.

FIG. 14 depicts an illustration where the original and the converted SQL statements are mapped and indexed by the key, which is the original (or source) SQL string.

Figures 16A, 16B:
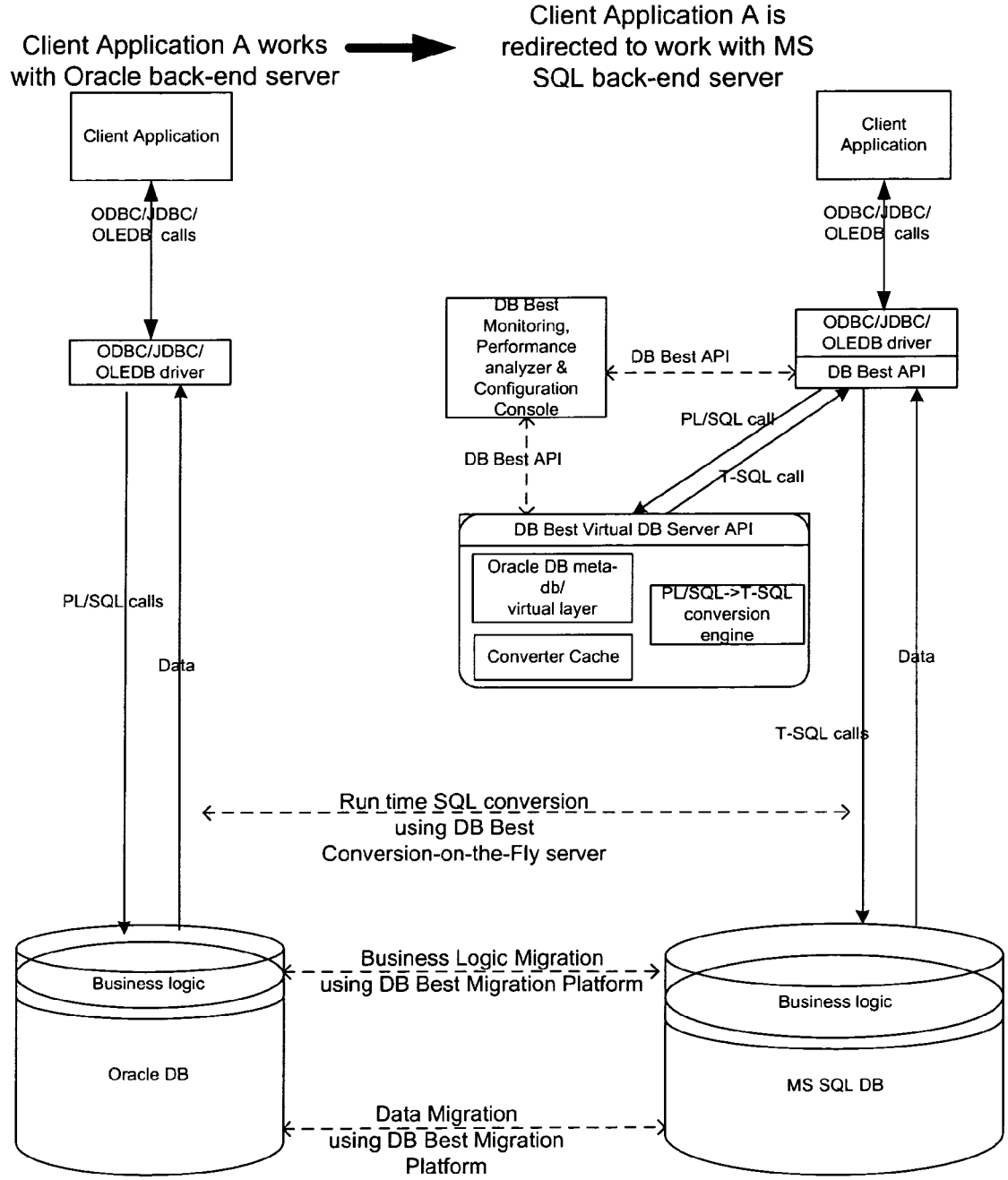
Figure 17:
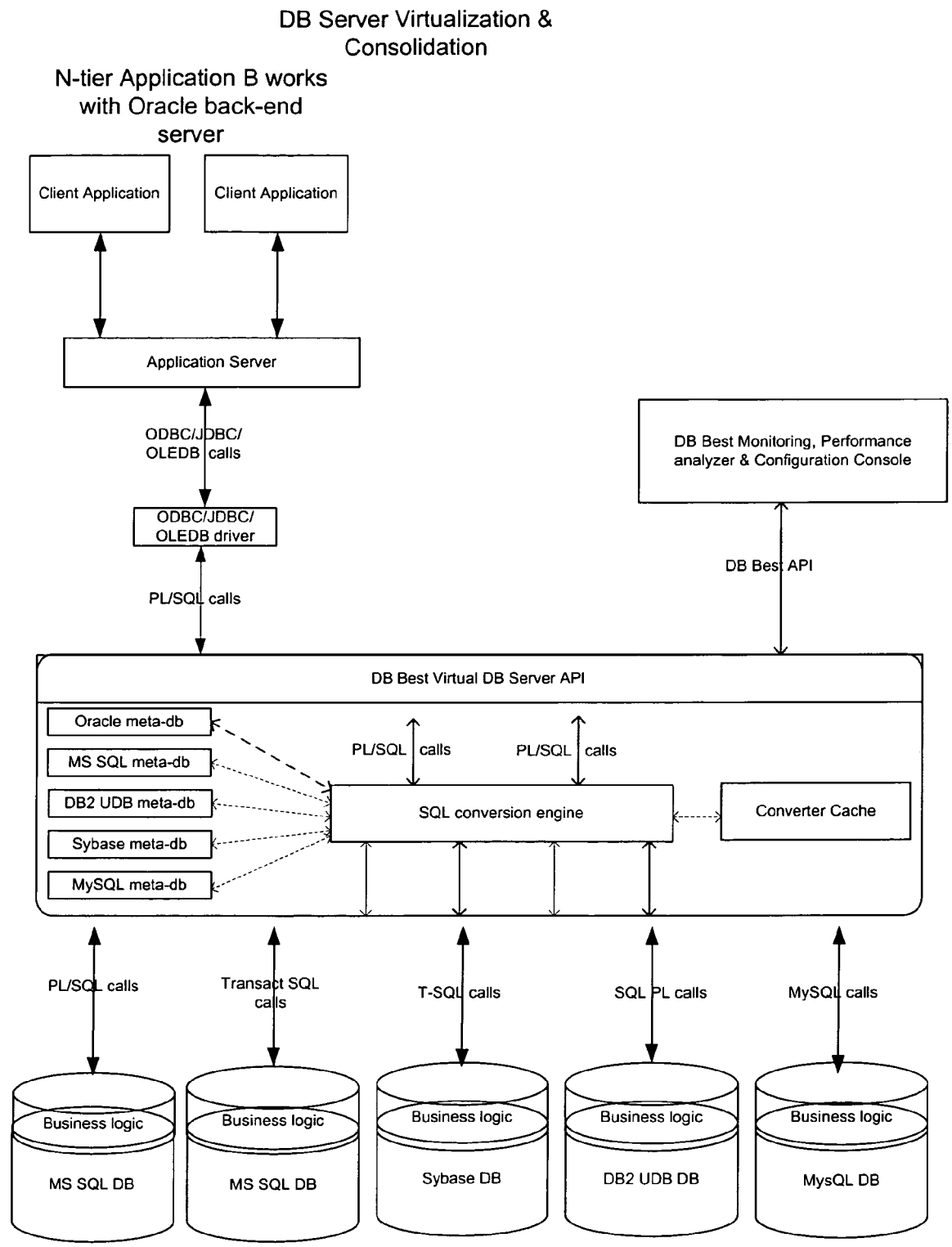

FIGS. 16a, 16b, and 17 show two examples of architectures for a database virtualization middleware that allows multiple clients or applications to work with multiple databases while it was originally developed for a single database vendor.

6. DETAILED DESCRIPTION

This embodiment of the inventive concept provides a method of migrating the database schema and SQL code that enables back-and-forth database conversion between various platforms without losing original functionality.

Figure 2:
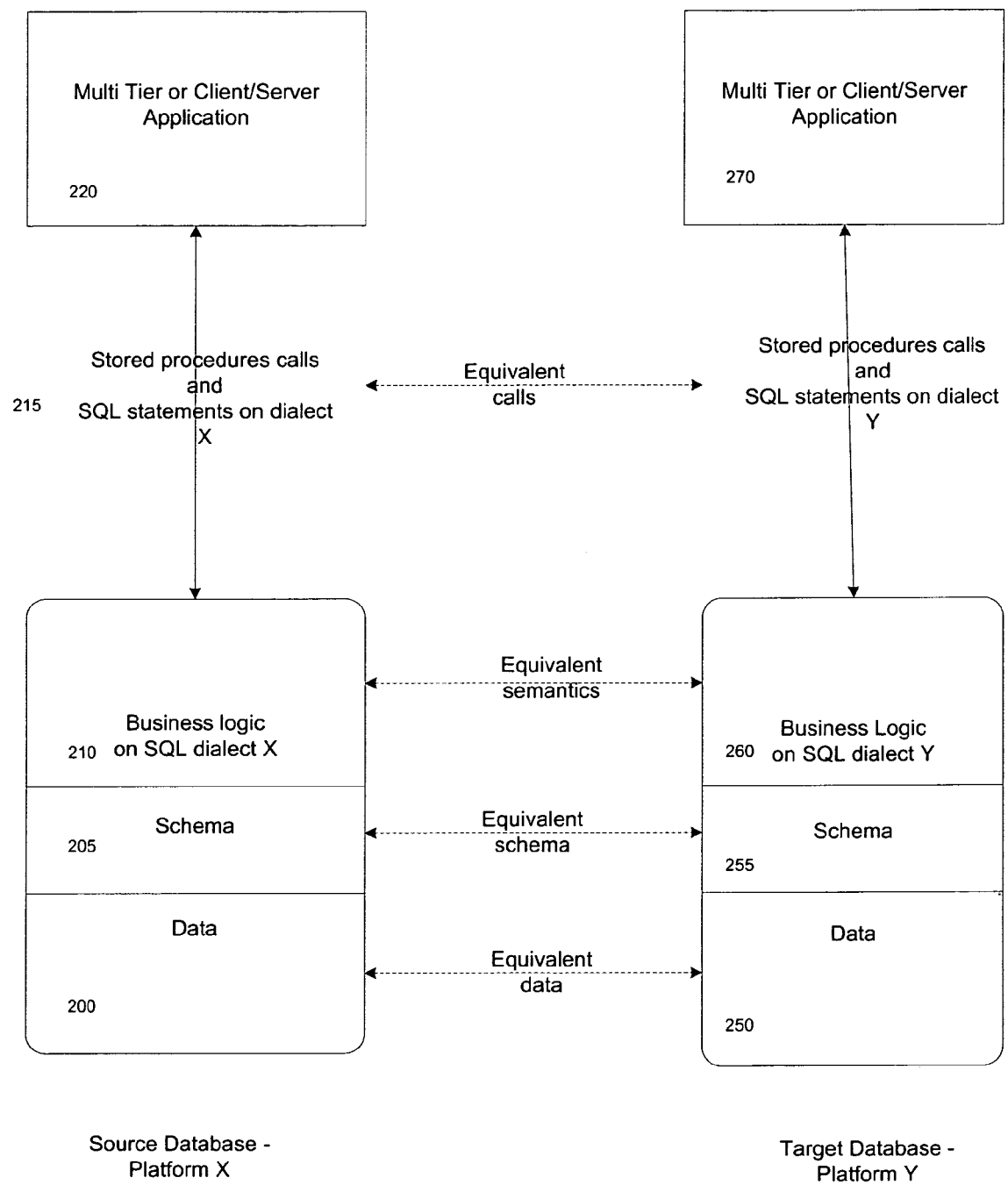
FIG. 2 is a general block diagram depicting major components of database migration according to an embodiment of the invention.

FIG. 2 is a general block diagram depicting major components of database migration. In FIG. 2, the source database is designated as Platform X, while the target database is designated as Platform Y. Platform X and Platform Y may be of any relational databases including, without limitation, Oracle, SQL Server (Microsoft), DB2 UDB (IBM), Sybase, MySQL, PostgreSQL, and the like. The general structure of Platform X and Platform Y mirror each other, and is depicted as a "layered" structure. The bottom layer is the data layer, 200 and 250, and is generally represented using tables (sometimes called relations). Each table in a database is uniquely identified by name and consists of rows and columns. The tables' structure attributes are defined by the schema (or relation schema) 205 and 255. The business logic layer is depicted as 210 and 260. Various procedure calls and SQL statements may be stored on the server or the client and are shown as 215 and 265. Finally, the application layer is shown at 220 and 270. The application may reside on the server and accessible by the client, or it may reside on the client or be a multi-tier structure. Of course, the only layer that is generally visible to the user is the application layer or, more specifically, the user interface of the application layer.

The first aspect of database migration according to an embodiment of the invention is moving the schema from one platform to another. This usually involves migration of the tables, database objects and data types. The types that exist on both platforms and represent exactly the same concept are very easy to convert. However, certain data types don't exist on the target database platform. These data types are converted to the closest matching data types in the target platform. This mapping is very important and may later be used in other embodiments of the inventive concept.

Figure 3:
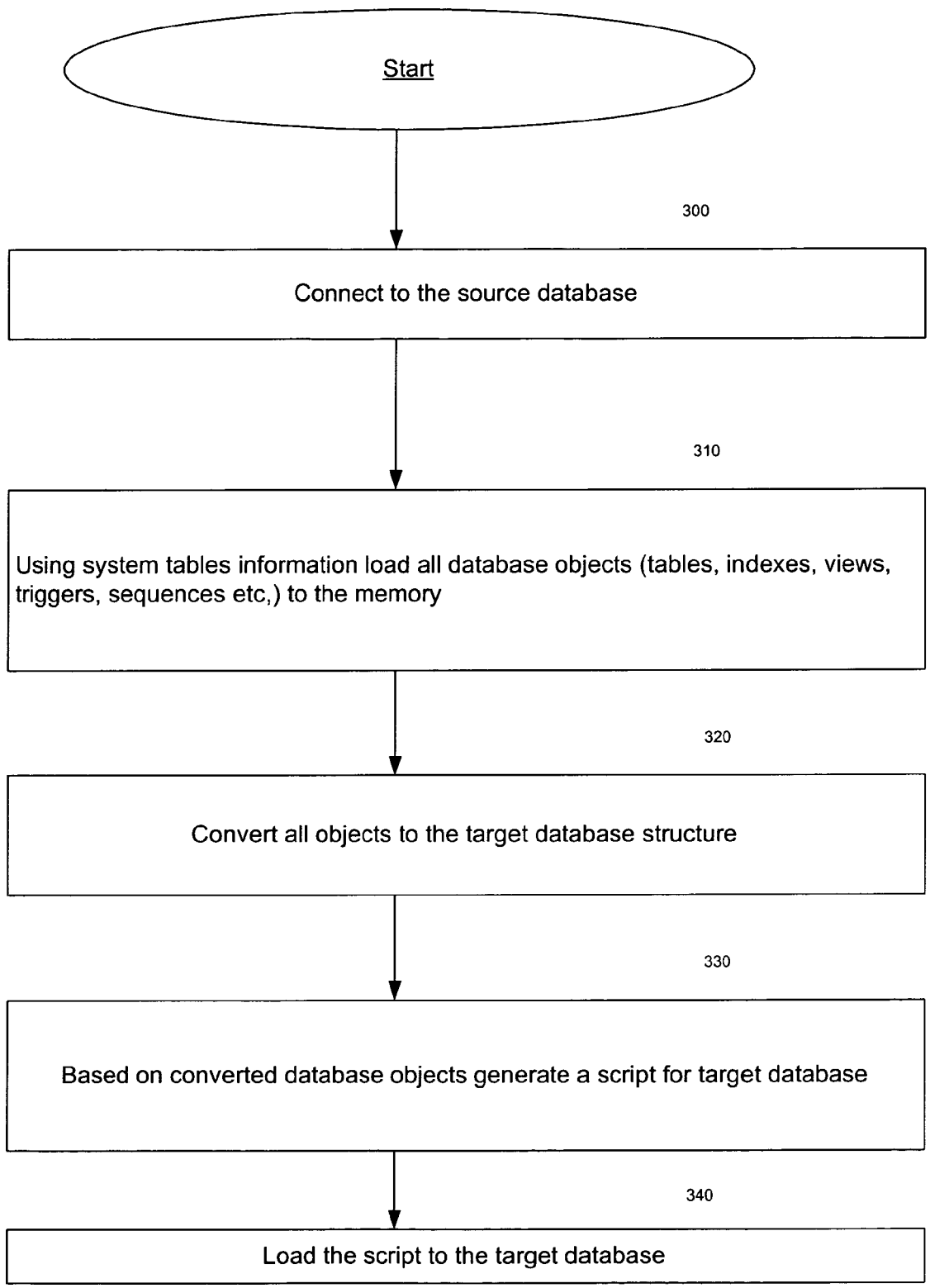
FIG. 3 is a block diagram of schema conversion according to an embodiment of the invention.

The process for schema conversion is depicted in FIG. 3 and is accomplished using following steps. In Step 300, the method proceeds to connecting to the source database (Platform X in FIG. 2) and querying for all database objects (tables, stored procedures, cursors, sequences, triggers, etc.). All these objects are stored in memory (Step 310) in the form of a tree structure, and later referred to as the meta-database model. Each object in the meta-database model has attributes and references to other objects. This is required in order to keep all needed database information for an accurate conversion to the target platform. Most of the objects like tables, stored procedures, indexes etc. are converted using the information from the source meta-database (Step 320). This is accomplished by simply copying the object over to the destination meta-database with some obvious changes.

Figure 4:
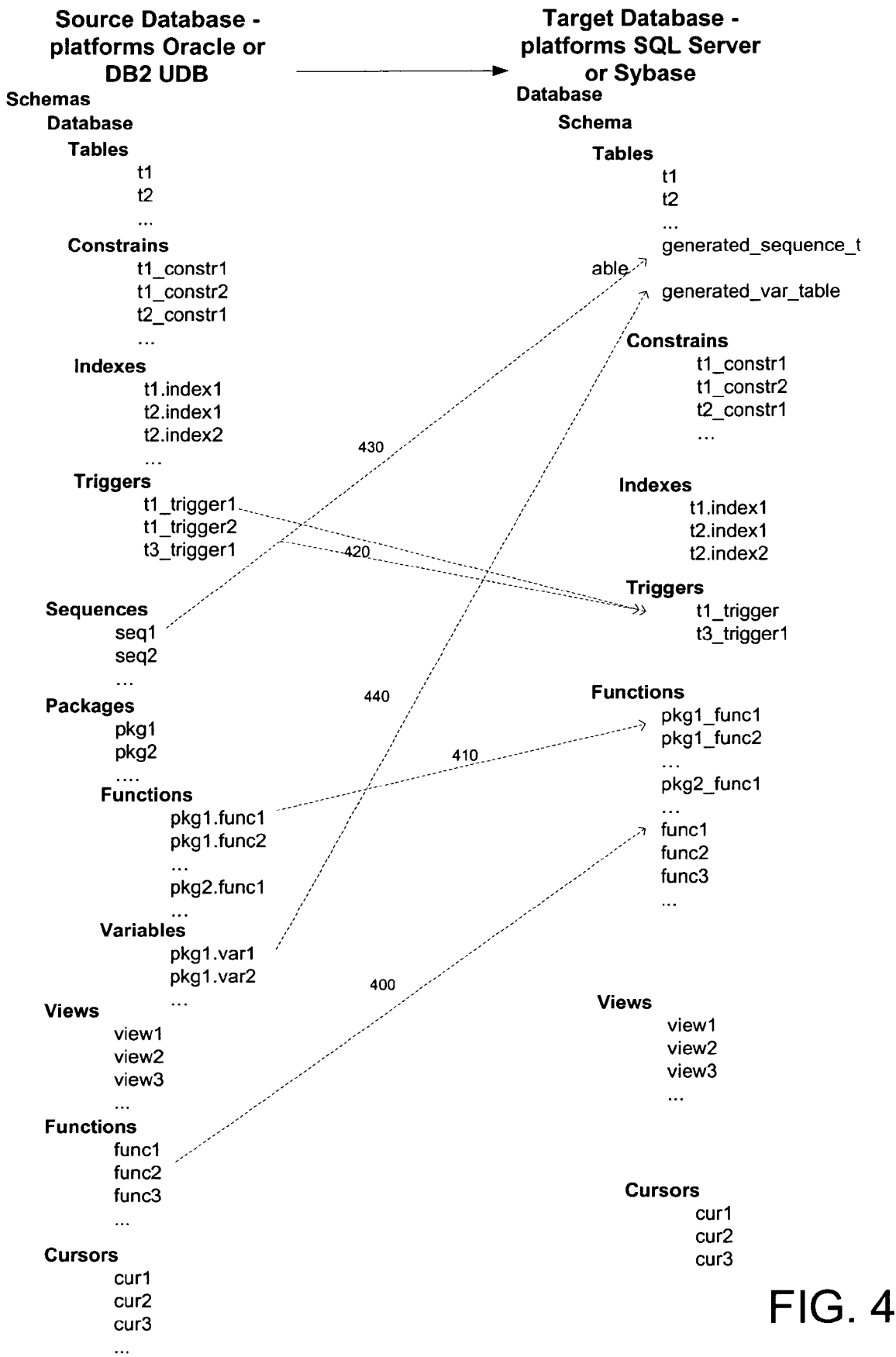
FIG. 4 depicts an example of database object conversion, in this case from Oracle or DB2 UDB to SQL or Sybase.

An example of database object conversion, in this case from Oracle or DB2 UDB to SQL or Sybase, is depicted in FIG. 4. On the left hand of FIG. 4 are the object structure of the source database, in this example of Oracle or DB2 UDB; while on the right hand side are the object structure of the target database, in this example, SQL Server or Sybase. Arrow 400 depicts an example of a conversion that doesn't modify the source object structure. For example, in this case the object func1, remains as func1 in the target database.

Arrow 410 depicts an example of handling a packaged function, which is not supported in the target database. In this example, neither SQL Server or Sybase supports packages. Therefore, in the conversion, pkg1_func1 is transformed into the target database independently of any package and, consequently, a new unique name is given to the function, in this case pkg1_func1. Additionally, every call to the original packaged function should be changed in the converted database to a call to the newly named function. Similarly, arrow 440 depicts an example of a packaged variable pkg1_var1 that needs to be converted into the target database, which doesn't support packaged variables. In this example, the packaged variable is emulated by a new table and a table variable entry. The table is given a name, in this case generated_var_table, and the entire row is dedicated to the value of the original variable.

Arrows 420 depict another type of object conversion. In this example, the source database has two triggers designated to the same table, of the same type (shown as t1_trigger1 and t1_trigger2_—t1 being the designation of the table). Such a designation is not allowed in target databases, such as SQL Server and Sybase. Therefore, the two triggers need to be converted into a single trigger (shown as t1_trigger). Target trigger t1_trigger will perform both functions of original triggers 1 and 2.

Some objects exist in the source database platform, but not in the destination one. For example, sequence objects in Oracle don't have a parallel structure in SQL Server. They are implemented as an entry in the specifically created table. Arrow 430 depicts an example of conversion of a sequence seq1 from the source into a table in the target. A more detailed explanation of this process is shown in FIG. 6 and will be explained in more details below.

Returning to FIG. 3, after the source meta-database is converted to the target one, the SQL script is generated by each meta-database object in the tree (Step 330). Thus, an overall script for the database creation is generated. This script is all that is required to create a database on the target platform, which is equivalent to the source database. This result script is loaded to the target database platform to create a new database (Step 340).

After the schema is migrated, the stored procedure code (215 in FIG. 2) is to be converted to the target SQL dialect. An embodiment of the inventive concept provides a method for automating this process so that approximately 80% of SQL code is converted automatically. This component of the solution is called and further related to as "SQL Converter". There are many challenges in stored procedure conversion. The short list of them includes, without limitation:

Identifying and mapping trivial syntactic differences in language structures. See, for example, at Statement #1, FIG. 1, where the SQL Server dialect requires the addition of an ampersand "@" before the definition of the ITEM_ID.

Identifying equivalent semantic structures (but differ in syntax) and mapping them. See, for example, at Statement #2, FIG. 1, where the structure of the SELECT statement needs to be rearranged.

Identifying structures that require type information for correct conversion. For example, FIGS. 5a and 5b depict a conversion of a variable definition that is not supported in the target database. In this example, in the source database (in this example, Oracle) the variable type is not defined beforehand, but rather the definition is pointing to a table and defines the variable type to be the same as that in the table. Such a definition is not allowed in the target databases, such as SQL Server. Instead, during the conversion the variable type is positively defined. In the example of FIG. 5a the variable is defined as a number, while in the example of FIG. 5b the variable is defined as a variable character (e.g., VARCHAR2)

Figure 6B:
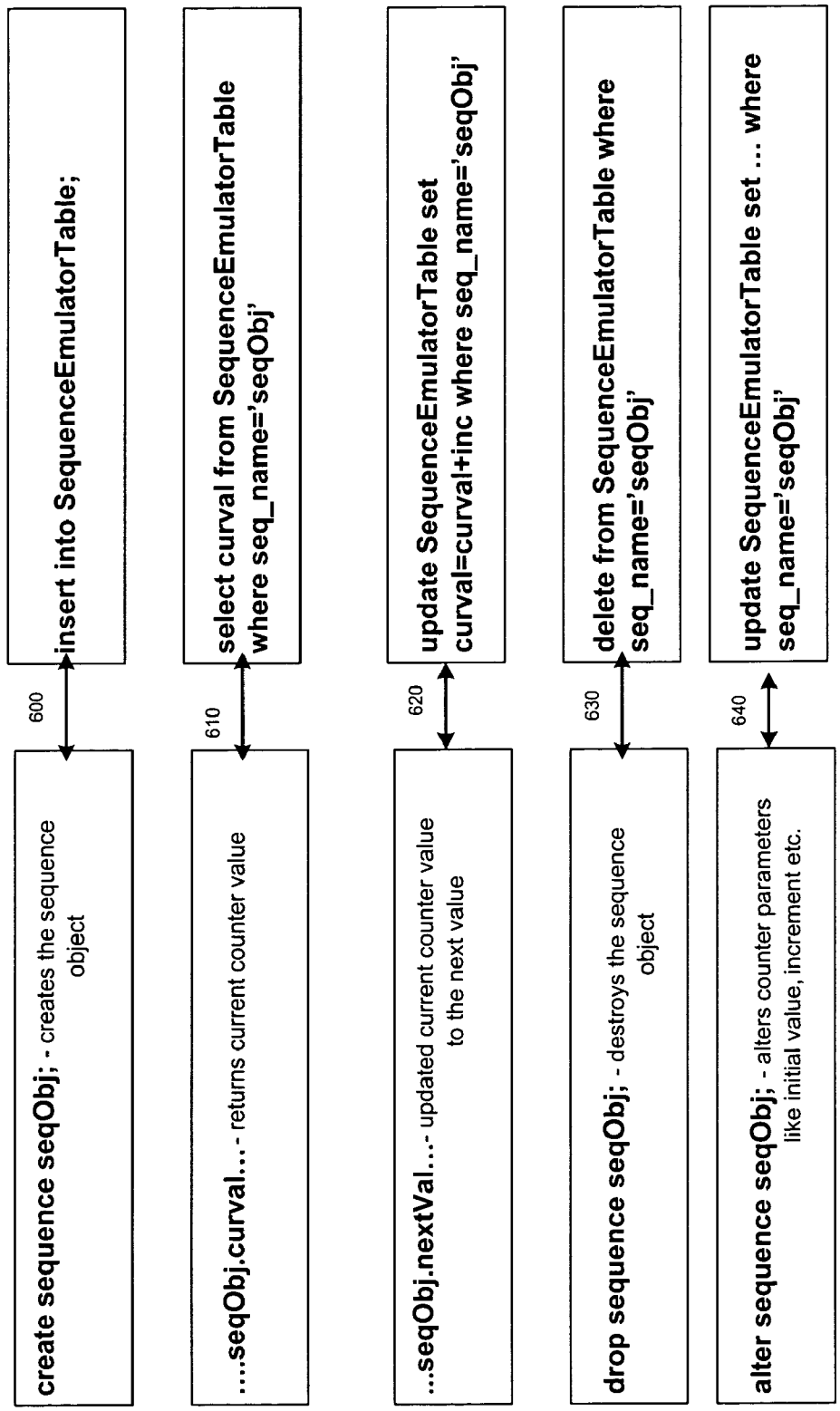

Bridging over non-existing structures by emulating them in the target SQL dialect. For example, FIG. 6a depicts an example of bridging over non-existing structure, in this case an Oracle sequence, by emulating them in the target SQL dialect, in this case an SQL Server. In this example, a Sequence object, serving as a counter, is implemented as a table in SQL Server. In this example, the table is given a minimum value, a maximum value, an increment value, a current value, and is given the name EquenceEmulatorTable. FIG. 6b depicts how the table emulates the functions of the sequence object. In 600, the sequence object is created on the Oracle side, while a new line is inserted in the table on the SQL Server side. In 610, the current sequence value is fetched on the Oracle side, while the current value is fetched from the table on the SQL Server side. In 620, the current sequence value is updated to the next value on the Oracle side, while the current table value is updated to the next value (according to the increment value) on the SQL Server side. In 630, the sequence object is deleted on the Oracle side, while the table is deleted from the SQL Server side. In 640, a counter parameter, such as initial value, increment value etc. is altered on the Oracle side, while the corresponding values (minimum value, maximum value, increment value, etc.) are altered in the table on the SQL Server side.

Handling transition between different language scopes. See, for example, the differences in the variable declaration scope between Oracle and SQL Server, demonstrated in FIG. 7. Notable, Oracle PL/SQL allows the same variable name to be re-declared in different blocks and to assume different types of values. On the other hand, SQL Server doesn't have such functionality. Rather, in SQL Server a variable may only be declared once and assume only one type of values. Therefore, during a conversion, if an Oracle variable is declared more than once, only one declaration is transferred, and in the remaining declarations the variable need to be renamed. Consequently, all calls to the renamed variable need to change as well. As shown in the example of FIG. 7, the variable "i" is called twice in Oracle and, in the conversion the second occurrence is changed to "j".

Most of the developed SQL code used in the stored procedures and client applications uses the system functions (or packages of functions and procedures like in Oracle and DB2) of the source database platform. That is why the step of the system functions conversion is required. In this step the differences between the source and destination system function are identified and the package of newly created functions is generated.

This step insures that the system function called by the source stored procedure/function or client application will work at the target platform. This step is closely integrated with the SQL Converter, which takes the decision of how each language component should be converted. SQL Converter will recognize the reserved words, which refer to the system function and will know how to translate them correctly using the converted system function package.

While converting the SQL code from a source dialect to a target one, many system functions need to be migrated as well. For example, most mathematics and string manipulation functions are present at both platforms. An example of system function migration, in this case from Platform X being Oracle to Platform Y being SQL Server, is depicted in FIG. 8. In this example, various pre-existing functions of the target database are used to provide an equivalent results obtained from the source system functions. Arrow 800 depicts an example of combination of functions, e.g., "SYSDATE" (i.e., current date), "NVL" (compares to null), "concat" (concatenation of two strings), "subst" (substring) and "mod" (modulo, i.e., returns the remainder). During conversion various SQL Server system functions are used to provide the utility of these source functions. In this example, the target system functions used are "getdate," "isnull," "+," substring," "%," respectively. Arrow 810 depicts an example of the source system function "add_month", which adds the stated number of months to the current date. During conversion, the target system function "DATEADD" is used to provide the same functionality. Arrow 820 depicts an example of a source system functions "to_char," "to_date," and "to_number," to obtain the three exemplary values shown; while during conversion the target system function "CAST" is used three times return the corresponding values. Arrow 830 depicts an example of an Oracle system function "extract," which returns year, month, day, hours, minute and second from the system's date, which is the current date. In the conversion, an SQL Server system function "DATEPART" is used to obtain the same results. Arrow 840 depicts an example of an Oracle "Decode" system function which, depending on the value of the variable, returns a corresponding city name. In converting to SQL Server, the "CASE" system function of SQL Server is used to obtain the same result.

However, many such functions differ in syntax and might have a slightly different logic. For example, an empty string is handled differently by Oracle and SQL and, therefore, selecting an existing target system function may return different value than that returned by the source system function. Accordingly, according to an embodiment of the inventive concept, a step where a library of mapped system functions is provided. Specifically, for each potential target database a tailored function library is created. This library is loaded as the packaged module to the corresponding target database.

According to a further embodiment of the invention, conversion of stored procedures' SQL code (e.g., see business logic 210 in FIG. 2) is done using following process:

1. Parsing of the source SQL code and presenting each language component in the form of a tree. See FIGS. 9 and 10 for examples.
2. Each language identifier is referenced to its declaration point. See FIGS. 9 and 10 for examples. This is needed for conversion since different identifiers can have various scope and it needs to be known at the conversion time
3. Binding the object type information with the conversion rules. This step is essential for a correct conversion decisions in many cases. See FIG. 5 for examples.
4. Conversion of SQL statements to achieve the same semantic logic. All information is conveniently presented in the tree together with the declaration scopes, which makes the conversion a simpler task. See FIGS. 5-7 for examples.

Figure 9:
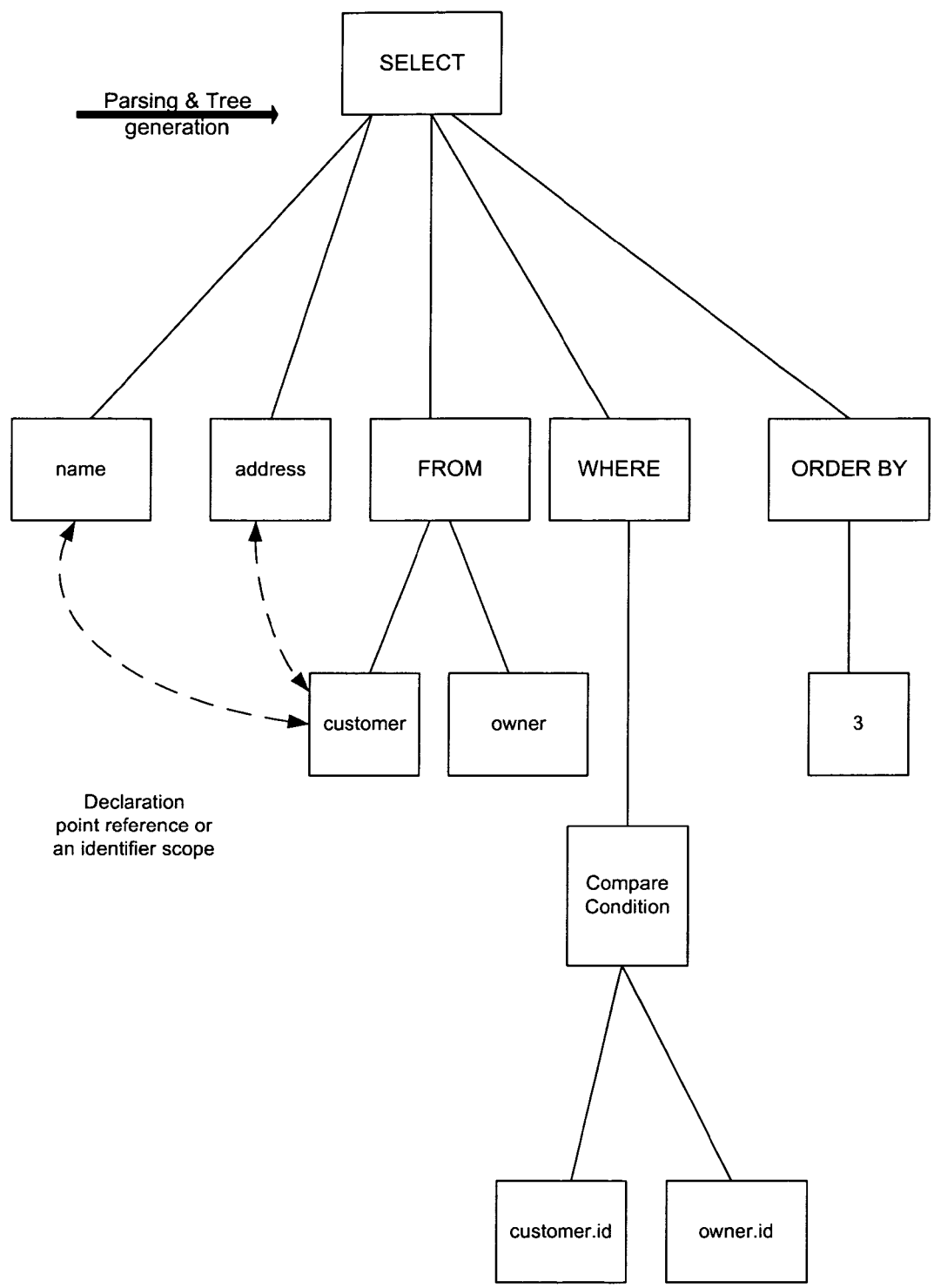
FIG. 9 depicts examples of parsing of the source SQL code and presenting each language component in the form of the tree.
Figure 10:
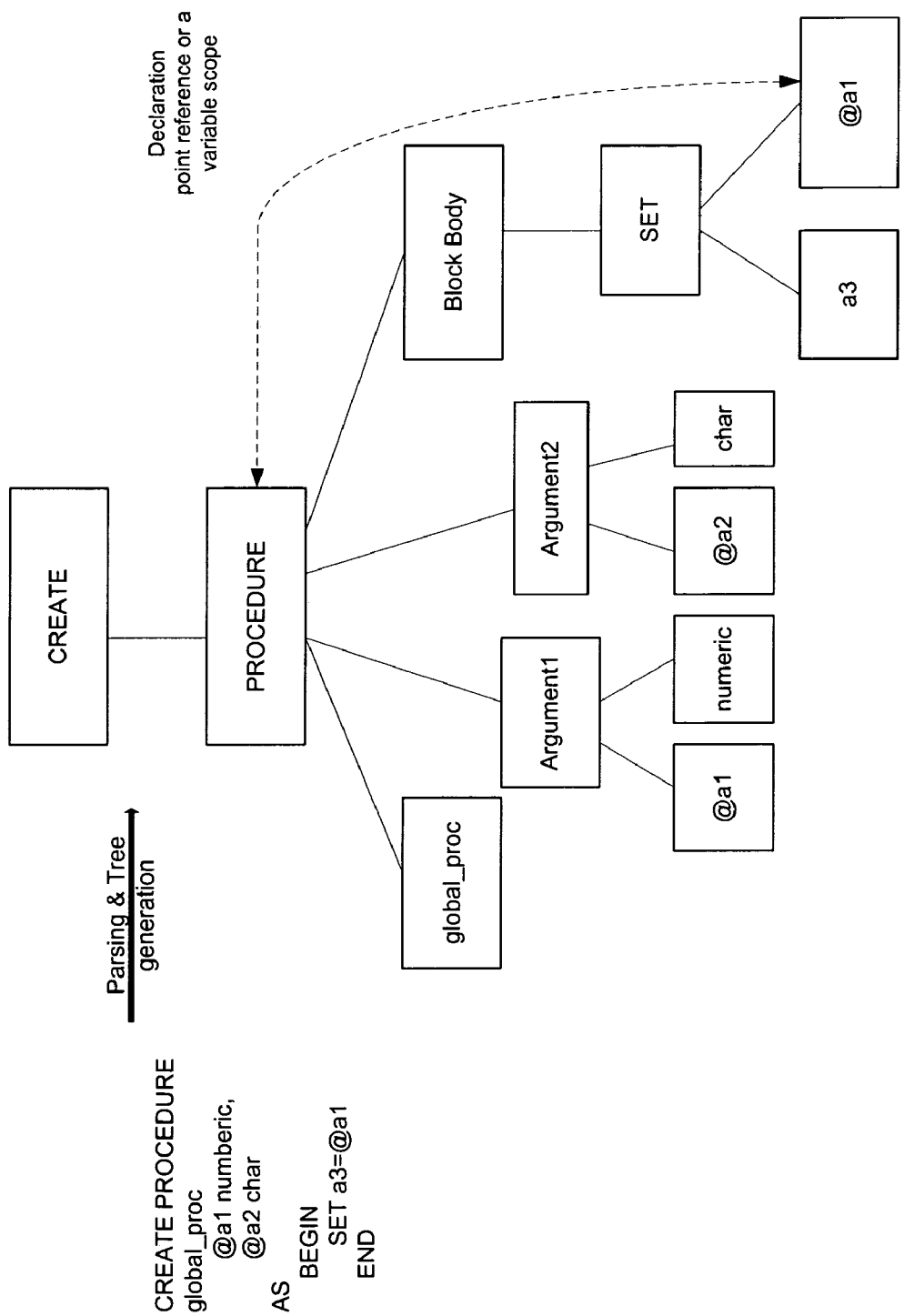
FIG. 10 Depicts an example of language identifiers referenced to appropriate declaration points.

In FIG. 9, a piece of code "SELECT customer.name, cutomer.address, FROM customer, oner WHERE customer.id=owner.id ORDER BY 3" is being converted. First the code is parsed and then a tree representation is constructed. The relationships of the various elements (shown as solid lines) and various declaration point references and identifier scope (shown as broken arrow) are maintained in the tree representation. FIG. 10 shows another example, wherein the code contains a procedure. In FIG. 10, the code "CREATE PROCEDURE global_proc @a1 numeric, @a2 char AS BEGIN declare @a3 SET @a3=@a1 END," is first parsed and then stored in a tree representation. As in the example of FIG. 9, the relationships of the various elements (shown as solid lines) and various declaration point references and identifier scope (shown as broken arrow) are maintained in the tree representation.

FIG. 11 depicts an example of SQL code parsing, tree presentation, the tree transformation and target SQL code generation. In Step 1 the original source code is loaded. In Step 2, the original code is parsed and is then stored in a tree form (similar to the examples shown in FIGS. 9 and 10). This tree form is constructed to correspond to the dialect of the source database. In order to migrate the code, a new tree representation is constructed, which corresponds to the target database dialect. Note, for example, that in the tree representation of Step 2, a single SELECT function is provided to return the values of both variables "num" and "price." In this example, the target database doesn't support a single SELECT function for the to variable. Therefore, two SELECT functions are provided in the tree representation of FIG. 3, each of one corresponding variable. After the target tree representation is complete, it is then converted to the target SQL code. The resulting target code is "UPDATE inventory SET id=(SELECT num from table WHERE name=inventory.name), price=(SELECT price FROM table WHERE name=inventory.name), WHERE state='CA'."

Another aspect of the invention is making a client application work with a target database platform without changing the source application's code. Generally this feature is beneficial for various situations. For example, a company may need to migrate to a new database platform, but wishes all users to be able to use the database without learning a new application. Similarly, an application provider may be able to write one version of its application and use this feature to run that version on any database platform.

Client application usually uses database drivers (special software components) that provide connection to the database through a well-defined interface. This embodiment of the inventive concept will show how the modification of this component combined with the technology of SQL code conversion enables the application to work with the different platform.

Figure 12:
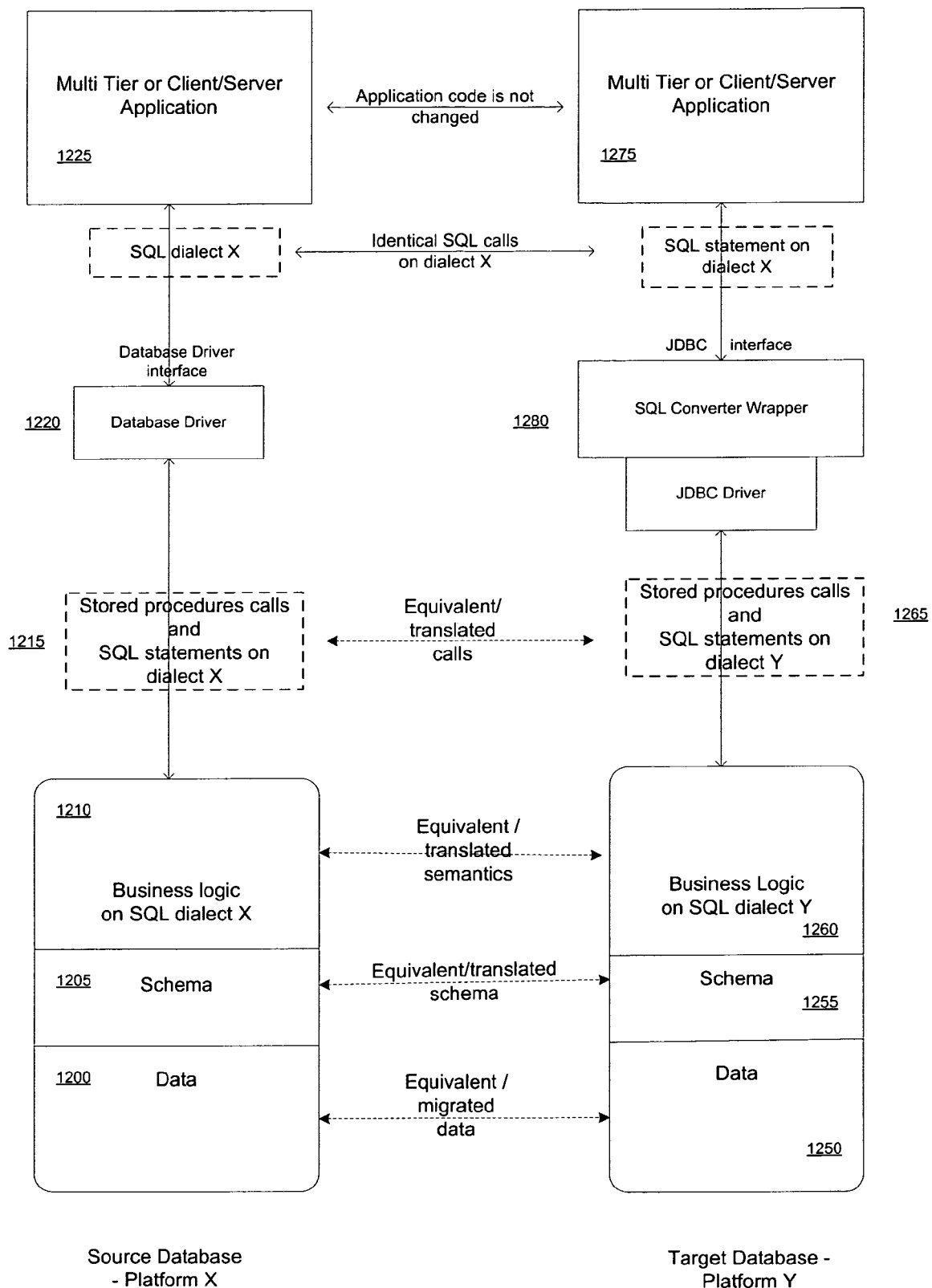
FIG. 12 is a block diagram of a database conversion with source application running on a target database according to an embodiment of the invention.

The general structure of an embodiment enabling a source application to run on a target database is depicted in FIG. 12. In FIG. 12, a source data 1200 has been migrated to target data 1250; source schema 1205 has been migrated to target schema 1255; source business logic 1210 has been migrated to target business logic 1260; and source stored procedures 1215 have been migrated to target stored procedures 1265. This can be done using the method of the invention as described herein, or any other conventional method. On the other hand, source database driver 1220 and source application 1225 have not been migrated. Rather, target Platform Y incorporates its own database driver 1270 and applications 1275.

A feature of this embodiment of the invention is the inclusion of Converter Wrapper 1280 in target Platform Y. According to this embodiment, when a user uses target application 1275, SQL statements from target application 1275 are issued in SQL dialect Y and, therefore, are sent to database driver 1270 for execution on target Platform Y. On the other hand, when a user executes a command on source application 1225, SQL statements are issued in dialect X. These statements are intercepted by Converter Wrapper 1280 and are translated to SQL statements in dialect Y, which are then sent to target driver 1270 for execution. In this manner, a user can use source application 1225 to run queries on target database without having to migrate to target application 1275.

The construction and operation of the embodiment depicted in FIG. 12 will now be explained with respect the following process. For the sake of simplicity below let's assume that the application is written in Java language and is using JDBC driver to connect to the database. The same conceptual process will work with other languages and ODBC/OLEDB/OCI drivers.

The wrapper above JDBC/ODBC/OLEDB/OCIdriver is provided. It implements exactly the same interface as the original database driver to the application. This is referred to as a "wrapper" in further text.

The wrapper intercepts a database connection call which was suppose to open connection to the database on Platform X. Seamlessly to the application, the wrapper redirects the call to the target database on Platform Y. All further database queries are issued to the database on Platform Y.

The wrapper catches SQL calls coming in from the application and calls SQL Converter to "translate" this call from the source to a target SQL dialect.

The source and target SQL calls (the original one is called source and the translated one is called target) are written into the cache and stored in the memory. The update to the cache is done only once for each type of the source SQL statement. If the source statement already appeared before (the wrapper stores all unique SQL calls in memory), the wrapper finds the appropriate entry in the hash table and fetches a translated, target statement.

The wrapper uses the translated target SQL statement to run on the target database platform.

The database driver wrapper implements the following features:

1. It implements the database interface so that the application code (that is used to work with the database driver before) almost doesn't change. The wrapper uses the database driver to access the underlying target database.

2. The wrapper has to include meta-database structure of database on Platform X in order to correctly convert incoming SQL statements that arrive on a source dialect SQL language. This is required for correct conversion—see details above regarding the SQL converter technology.

3. The wrapper uses the cache from an external source with the set of converted SQL statements. This cache can be prepared during application testing or supplied by any other source. It is simply a set of pairs (original_SQL_statement, converted_SQL_statement) indexed by original_SQL_statement, which is a key of this cache. The cache is used to store all possible conversion pair usable by the application. FIG. 14 depicts an illustration where the original and the converted SQL statements are mapped and indexed by the key, which is the original (or source) SQL string. The left column represents the original SQL statements in dialect X, while the right column shows the converted statement in dialect Y. Each row represents a pair of the incoming SQL statement and the corresponding converted statement.

4. If the cache structure was not complete and the wrapper can't find the mapping to the original SQL statement, it will run SQL conversion software component according to the functionality described above (see the description on SQL Conversion. As described above, SQL conversion software needs to have a meta-database structure that represents all database objects and their types in the memory). After SQL conversion software returns a converted SQL statement, the wrapper will update the cache with a new pair of statements. This mechanism allows the wrapper to learn during application run time so that it includes the mapping for all possible SQL statements coming from the application.

Steps #3 and #4 can introduce insignificant performance hit for an application. Step #3 will require only 2 additional execution calls so this performance hit is unnoticeable. Step #4 can be more time consuming and depends on the complexity of the incoming call. However, this additional calculation is only performed once for each new type of incoming SQL statement.

Figure 13:
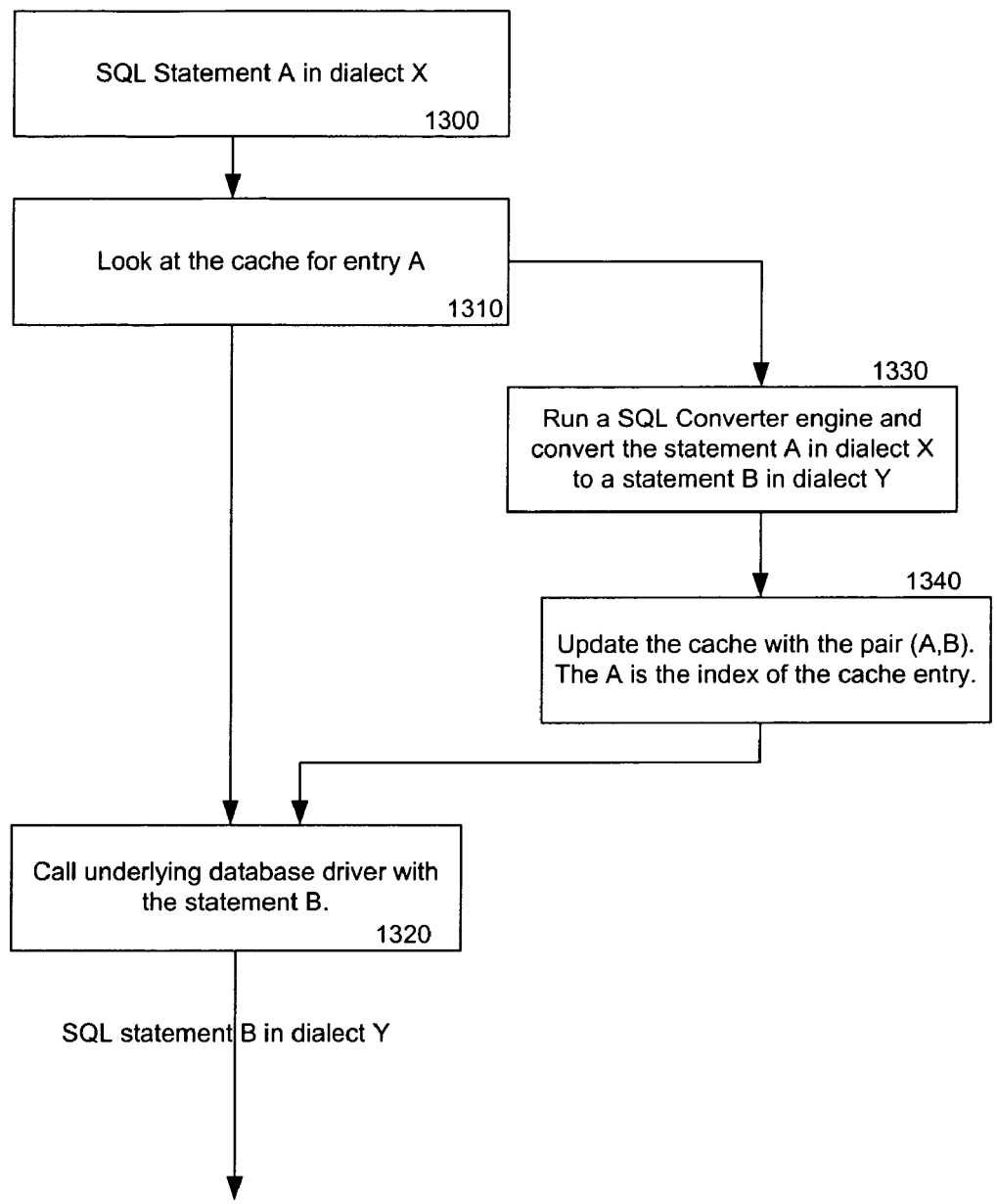
FIG. 13 is a block diagram showing a run-time SQL conversions process according to an embodiment of the invention.

FIG. 13 is a block diagram showing a run-time SQL conversions process according to an embodiment of the invention. Shown at 1300 is an SQL statement A coming from an application residing on the source, Platform X, and is in dialect X. At 1310 the wrapper checks the cache to see whether an entry equivalent to the received SQL statement is in the cache. If so, the process proceeds to step 1320, where the wrapper fetches the corresponding SQL statement in dialect Y from the cache and sends statement B (in dialect Y) to the target database driver. On the other hand, if no equivalent statement is found in the cache, the process proceeds to 1330 where an SQL conversion routine converts the received statement A in dialect X into statement B in dialect Y. At 1340 the cache is updated with then new pair of received statement A and converted statement B. The process then proceeds to step 1320, where statement B is sent to the target driver in dialect Y.

Important: while discussing SQL Converter component we mentioned that sometimes only 80% of automatic conversion is achievable because of SQL dialects discrepancies. This can introduce the problem while converting the real time SQL statement. To solve this problem the following solutions are proposed:

SQL Converter is extended to produce the "hard-coded" conversion pairs like in Step #4. These cases can be identified during application testing. It will be invisible for an application code.

To take the above solution to extreme, the whole SQL Converter can be a set of hard coded conversion pairs that cover all possible types of SQL calls coming from the client. While this solution can be cumbersome and labor consuming, it eliminates the dependency on the automatic SQL Conversion component. Here, the SQL Converter can serve as a "black box" which can be replaced as long as it supports the same interface and functionality.

FIGS. 16a, 16b, and 17 show architectures that can be used to implement a middleware layer that provides a full abstraction above databases of different vendors. This layer is required for conceptual separation of database driver from the SQL Converter. It encapsulates all little details of the SQL conversion, cache population and meta-database generation. It also solves the problem of multiple clients access which may update database structure in the run time.

FIG. 16a illustrates the original source architecture, while FIG. 16b illustrates the end-state, showing the new architecture resulting from the modifications to the original source database. Unlike the architecture of FIG. 12, in this architecture the database driver is redirected to a visualization middleware. This can be done seamlessly to client application similarly to SQL Converter wrapper implementation described above. The benefit of this architecture is that the data is moving directly between the driver and the database without going through any additional middle layers.

FIG. 16a depicts the initial state, where the system comprises a source database 1600, business logic 1610 communicating with source driver 1620, which, in turn, communicates with client application 1630. FIG. 16b depicts the final state comprising target database 1640, of a different vendor from source database 1600, and business logic 1650. Database 1640 and business logic 1650 may be a migration of source database 1600 and business logic 1610 according the various embodiment described above, or according to any other known method. Driver 1620 and client application 1630 are migrated to the new database unchanged. Added to the target architecture is middleware 1660, which interface to the driver 1620 via database application programming interface (API) 1675 and virtual server API 1665. The middleware comprises a conversion engine 1670 and converter cache 1680, which may be a conversion engine implemented as described above. Also included in the middleware 1660 is a source meta-database virtual layer. The middleware 1660 can be configured using the monitoring, performance analyzer and configuration console 1690.

In the new configuration of FIG. 16b, when a call is issued by the client application 1630, it is sent to the driver 1620. The call is then communicated to the middleware 1660 for conversion. Once the call is converted, the converted call is sent back to the driver 1620 and, from the driver 1620, to the database 1640. In this manner, the calls are not communicated to the database from the converter, but rather from the driver.

FIG. 17 illustrates alternative architecture where database the virtualization middleware 1700 emulates the database relative to the client applications 1710, 1720, etc. In this architecture there is no change to the database driver 1740, which issues data query calls on SQL dialect of the source platform A, as the original application was designed. The major difference here (compared to architecture in FIG. 16b) is that the database virtualization layer 1705 behaves like a physical database which accepts incoming SQL queries from multiple clients, works directly with the physical database (1750, 1755, 1760, 1765, 1770, etc.) and returns the dataset to the original application. This middleware 1700 includes meta-database of the original database (1701, 1702, 1703, 1704, 1706, etc.), SQL converter engine 1707 and the converter cache 1708. Configuration of the middleware 1700 is done by the monitoring, performance analyzer and configuration console 1780. The primary benefit of this architecture is that it allows truly consolidating databases of multiple database vendors entirely seamless for a client application.

In the example of FIG. 17, when a call is issued from the server application, 1730, it is sent by the driver 1740 to the middleware 1700. The middleware 1700 is configured to the appropriate database by the configuration console 1780. When the call is received by the API 1705, the conversion engine 1707 checks the cache to see if such a call has already been converted. If so, the converter 1707 fetches the corresponding converted call and sends it to the appropriate database. If such a call has not been previously converted, the conversion engine 1707 converts the call (according to the appropriate meta-database) and sends the converted call to the appropriate database. The conversion engine 1707 also stores the received call and the converted call in the cache 1708.

Figure 15:
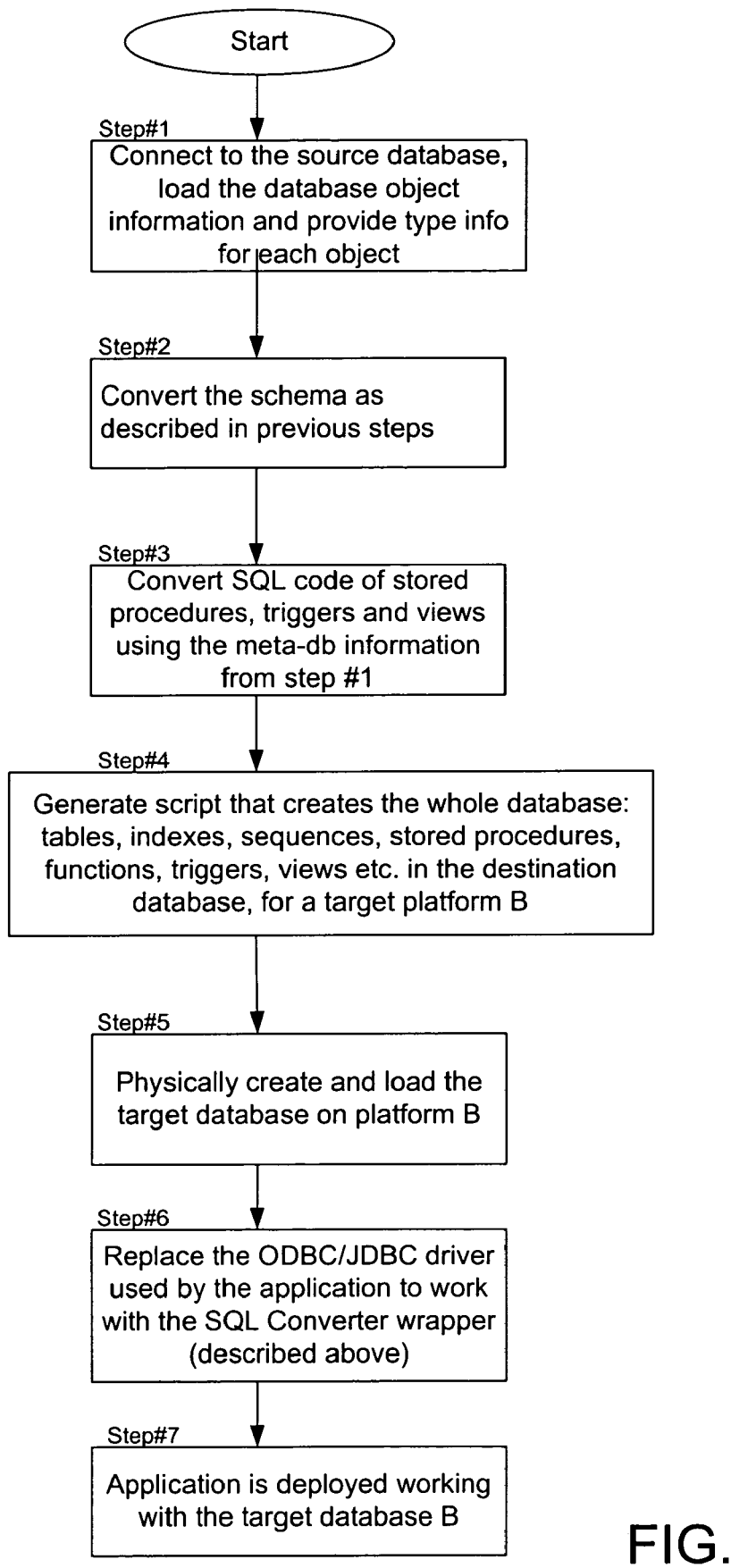
FIG. 15 depicts an overall process of migrating a source database and enabling a source application to work with the newly migrated target database.

An overall process of migrating a source database and enabling a source application to work with the newly migrated target database is illustrated with reference to FIG. 15. The system input is source database at platform A, and the output is target database at platform B, which performs the same functionality as the source database at platform A. The precise steps are the following:

Step 1: source meta-database creation, loading to the memory. This meta-database is presented in the form of the tree and represents the essence of the data model.

Step 2: conversion of the schema by migrating the source database objects into the destination ones. During this conversion the objects like tables, columns, indexes, sequences etc. can change their parameters because of the inconsistency in the data types in source and destination databases.

Step 3: extracting the SQL code of the stored procedures; parsing of the SQL code and presenting it in the internal tree structure; declaration point reference are setup for local identifiers; conversion of the parsed tree into the destination platform tree. The tree is transformed appropriately to express the actual SQL code conversion. Finally, "pretty printer" component prints the converted code with the proper tabulation, emphasizing correct language components.

Step 4: the converted schema tree, produces the script. This script is loaded to create the target database objects.

Step 5: the converted SQL stored procedures are loaded into previously converted target database.

In order to enable the source application to function with the migrated target database, the following steps may be performed:

Step 6: The source database driver is replaced so as to work with the converter wrapper.

Step 7: The application is deployed, working with the target database B.

The invention is described herein with reference to particular embodiments thereof which are exemplified in the drawings. It should be understood, however, that the various embodiments depicted in the drawings are for illustration only and may not limit the invention as defined in the appended claims. Additionally, while the invention has been described with reference to particular embodiments thereof, it is not limited to those embodiments. Specifically, various variations and modifications may be implemented by those of ordinary skill in the art without departing from the invention's spirit and scope, as defined by the appended claims.

What is claimed is:

1. A method for migrating a database from a source database platform to a target database platform, said method comprising:
    querying a source database of the source database platform for one or more source database objects, wherein the source database comprises data, a schema that defines attributes of the data to form the one or more database objects, and stored procedures implemented in a source SQL code compatible with the source database platform, where the source database implements a first dialect of SQL comprised of first SQL statement syntaxes that are specific to the first SQL dialect and that define textual syntax of respective SQL statements, where the source database is configured to receive and execute first SQL statements comprising strings that conform to the first SQL syntaxes, and where the source SQL code of the stored procedures comprises SQL statement strings that conform to one or more of the first SQL statement syntaxes;
    creating and loading into a memory a source meta-database, wherein the source meta-database represents a data model of the source database, wherein the source meta-database comprises the source database objects queried from the source database;
    converting the schema of the source database into a schema of a target database of the target database platform by migrating the source database objects in the source meta-database into target database objects, wherein during the conversion one or more of parameters, number of fields, and structure of one or more source database objects are changed in accordance with characteristics of the target database platform, where the target database implements a second dialect of SQL comprised of second SQL statement syntaxes that are specific to the second SQL dialect and that define textual syntax of respective SQL statements, where the target database is configured to receive and execute second SQL statements comprising strings that conform to the second SQL syntaxes, where the first dialect of SQL and the second dialect of SQL differ in that, for a plurality of SQL statements, corresponding first SQL statement syntaxes define textual syntaxes that differ from textual syntaxes defined by corresponding second SQL statement syntaxes that correspond to the plurality of SQL statements;
    extracting the source SQL code of the stored procedures from the source database;
    parsing the source SQL code and, for each SQL statement string therein, generating a corresponding source database tree that represents the SQL statement string according to the first SQL dialect;
    for each source database tree, converting the source database tree into a target database tree that represents the corresponding SQL statement string according to the second SQL dialect, and generating target source code from the target database tree, the target source code comprising a corresponding SQL statement string that conforms to a SQL statement syntax of the second SQL dialect;
    loading the target SQL code into the target database platform to create the target database; and
    implementing a converter wrapper on a driver of the target database, wherein the converter wrapper receives SQL statement strings of the first SQL dialect from an application configured to communicate with the source database, and converts the SQL statement strings into SQL statement strings of the second SQL dialect, and the target database executes the converted SQL statement strings.

2. The method of claim 1, wherein when a source database object structure does not have a corresponding target database object structure, the source database object is emulated in the target database in the form of a table.

3. The method of claim 1, wherein said converter wrapper comprises a cache having entries of source calls and corresponding converted calls.

4. The method of claim 3, wherein when a new call is received, the converter wrapper queries the cache to determine whether such a call is stored in the cache and:
    if so, the converter wrapper fetches the corresponding converted call; if not, the converter wrapper converts the new call into a new converted call and stores in the cache the new call and the new converted call.

5. The method of claim 4, wherein the converter wrapper sends the converted call or the new converted call to the target database.

6. The method of claim 4, wherein the converter wrapper sends the converted call or the new converted call to said driver.

7. The method of claim 5, further comprising a virtual database server interposed between said driver and said target database.

8. The method of claim 7, wherein said converter wrapper comprises a plurality of meta-databases.

9. A method of allowing a source client application implemented to run against a source database on a source platform to run against a target database on a target platform different from the source platform, where the source database implements a first dialect of SQL comprised of first SQL statement syntaxes that are specific to the first SQL dialect and that define textual syntax of respective SQL statements, where the source database is configured to receive and execute first SQL statements comprising strings that conform to the first SQL syntaxes, where the target database implements a second dialect of SQL comprised of second SQL statement syntaxes that are specific to the second SQL dialect and that define textual syntax of respective SQL statements, where the target database is configured to receive and execute second SQL statements comprising strings that conform to the second SQL syntaxes, the method comprising:
    receiving, at a database virtualization middleware, a source SQL statement string from an application driver, the source SQL statement string conforming to a corresponding one of the SQL statement syntaxes of the first SQL dialect, wherein the source SQL statement string is incompatible with the target database in that the one of the SQL statement syntaxes differs from a corresponding one of the SQL statement syntaxes of the second SQL dialect, the application driver being configured to permit communication between the source client application and the target database by converting source SQL statement string to a target SQL statement string that conforms to the one of the SQL statement syntaxes of the second SQL dialect implemented by the target database;
    querying a cache to determine whether the source SQL statement string has been previously stored by the database virtualization middleware, wherein the cache is queried by searching among cache entries comprised of previously converted source SQL statement strings and corresponding converted target SQL statement strings;

if cache entry corresponding to the received SQL statement string is found, retrieving the corresponding target SQL statement string from the cache, the retrieved SQL statement string conforming to the one of the SQL statement syntaxes of the second SQL dialect;

if a cache entry corresponding to the source SQL statement string is not found, converting the source SQL statement string into a target converted SQL statement string that conforms to the one of SQL statement syntaxes of the second SQL dialect;

providing either of the target SQL statement strings to the application driver; and invoking, by the application driver, execution of the provided target SQL statement string by the target database.

10. The method of claim 9, further comprising storing in the cache the converted SQL statement string if it is determined that the converted SQL statement string is not stored in the cache.

11. The method of claim 9, further comprising emulating said target database to the source client application.

12. The method of claim 9, further comprising storing logical representations of corresponding target databases in a plurality of meta-databases.

13. A database virtualization middleware system that allows a source client application implemented to run against a source database on a source platform to run against a plurality of target databases, where the source database implements a first dialect of SQL comprised of first SQL statement syntaxes that are specific to the first SQL dialect and that define textual syntax of respective SQL statements, where the source database is configured to receive and execute first SQL statements comprising strings that conform to the first SQL syntaxes, where each target database implements a different dialect of SQL comprised of SQL statement syntaxes that are specific to its SQL dialect and that define textual syntax of respective SQL statements, where each target source database is configured to receive and execute SQL statements comprising strings that conform to its SQL syntaxes, the first SQL dialect and the SQL dialects of the target databases different with respect to each other, comprising:

an SQL converter memory configured to store source SQL statement strings and corresponding target SQL statement strings in the different SQL dialects of the target databases;

an SQL converter engine that receives from a client application a source SQL statement string conforming to the first SQL dialect and specifically compatible with the source platform, wherein the SQL converter engine is configured to query the SQL converter memory to determine whether the source SQL statement string is stored therein, wherein the SQL converter engine fetches from the SQL converter memory a target SQL statement string for one of the target databases if the SQL converter engine determines that the source SQL statement string is available in the converter memory, wherein the SQL converter engine converts the corresponding target SQL statement string, according to an appropriate meta-database, to a target SQL statement string for the target database if the SQL converter engine determines that the source SQL statement string is not available in the converter memory, the SQL converter engine being further configured to submit the target SQL statement string to the target database, the target SQL statement string conforming to the SQL dialect of the target database.

14. The system of claim 13, wherein the SQL converter engine stores in the SQL converter memory the target SQL statement string for the target database after converting the corresponding source SQL statement string to the target SQL statement string for the target database.

15. The system of claim 13, wherein the source SQL statement string does not conform to the SQL dialect of the target database.

* * * * *

UNITED STATES PATENT AND TRADEMARK OFFICE
CERTIFICATE OF CORRECTION

| | | |
|---|---|---|
| PATENT NO. | : 7,664,795 B2 | Page 1 of 1 |
| APPLICATION NO. | : 10/952278 | |
| DATED | : February 16, 2010 | |
| INVENTOR(S) | : Dmitry Balin et al. | |

It is certified that error appears in the above-identified patent and that said Letters Patent is hereby corrected as shown below:

In column 7, line 47, after "times" insert -- t --.

In column 15, line 1, in Claim 9, after "if" insert -- a --.

Signed and Sealed this

Eighth Day of February, 2011

David J. Kappos
*Director of the United States Patent and Trademark Office*